(12) United States Patent
Uchida

(10) Patent No.: US 7,716,655 B2
(45) Date of Patent: May 11, 2010

(54) COMPUTER SYSTEM FOR COMPILING SOURCE PROGRAM

(75) Inventor: Katsuya Uchida, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 910 days.

(21) Appl. No.: 11/531,619

(22) Filed: Sep. 13, 2006

(65) Prior Publication Data

US 2007/0067759 A1    Mar. 22, 2007

(30) Foreign Application Priority Data

Sep. 13, 2005    (JP) ............................. 2005-265851

(51) Int. Cl.
 *G06F 9/45* (2006.01)
(52) U.S. Cl. ...................... 717/140; 717/141
(58) Field of Classification Search .......... 717/140–143
 See application file for complete search history.

(56) References Cited

U.S. PATENT DOCUMENTS

| | | | |
|---|---|---|---|
| 6,101,501 A * | 8/2000 | Breslau et al. .......... 707/103 R |
| 6,460,177 B1 | 10/2002 | Lee | |
| 6,851,108 B1 * | 2/2005 | Syme et al. ................. 717/146 |
| 2002/0078010 A1 * | 6/2002 | Ehrman et al. ................. 707/1 |
| 2004/0143801 A1 * | 7/2004 | Waters et al. ................. 716/3 |
| 2004/0215676 A1 | 10/2004 | Tang et al. | |
| 2005/0097523 A1 | 5/2005 | Uchida | |
| 2009/0077353 A1 * | 3/2009 | Devane ...................... 712/221 |
| 2009/0083358 A1 * | 3/2009 | Allen .......................... 708/495 |

OTHER PUBLICATIONS

Duggan "Type-Safe Linking with Recursive DLLs and Shared Libraries", Nov. 2002, ACM, TOPLAS, vol. 24, Issue 6, pp. 711-804.*
"C28x™ IQMath Library—A Virtual Floating Point Engine", Texas Instruments, Current Version v1.4d, Version Date Mar. 30, 2003, Sep. 13, 2006, 2 pages, http://wvvw.ti.com/iqmath.

* cited by examiner

*Primary Examiner*—Anna Deng
(74) *Attorney, Agent, or Firm*—Oblon, Spivak, McClelland, Maier & Neustadt, L.L.P.

(57) ABSTRACT

A computer system includes: a storage unit that stores the source program and type information representing data types including a fixed-point type; a detecting unit that obtains the source program from the storage unit and detects a type specifier and an immediate from the obtained source program; a type specifier analyzing unit that analyzes the type specifier and links one of a variable and a function, data type of which is specified by the type specifier, to the type information of the fixed-point type when the type specifier is a floating-point type to store in the storage unit; and an immediate analyzing unit that analyzes the immediate and links the immediate to the type information of fixed-point type when the immediate is any one of a decimal number without a postfix and a decimal number with floating-point type postfix to store in the storage unit.

5 Claims, 14 Drawing Sheets

| TYPE NUMBER | TYPE NAME | SIZE (BYTE) |
|---|---|---|
| 1 | char | 1 |
| 2 | short | 2 |
| 3 | int | 4 |
| 4 | long | 4 |
| 5 | float | 4 |
| 6 | double | 8 |
| 7 | short_Accum | 4 |
| 8 | long_Accum | 8 |

```
          D1          D2
          ┌──────┐    ┌──────┐
          │double│ func(│double│ a)
          └──────┘ D3 └──────┘
                  ┌──────┐
          {       │double│ b = a + 0.5;
                  └──────┘
              return b;
          }
```

| VARIABLE, IMMEDIATE, FUNCTION | TYPE NUMBER |
|---|---|
| func | 8 |
| a | 8 |
| b | 8 |
| 0.5 | 8 |

```
           ⋮
long_Accum func (long_Accum a)
{
        long_Accum b = a + 0.5k;
        return b;

}
           ⋮
```

```
              ⋮
double func (double a)
{
        double b = a + 0.5;
        return b;

}
              ⋮
```

| TYPE NUMBER | TYPE NAME | SIZE (BYTE) | INTEGER PART (BIT) | FRACTIONAL PART (BIT) |
|---|---|---|---|---|
| 1 | char | 1 | – | – |
| 2 | short | 2 | – | – |
| 3 | int | 4 | – | – |
| 4 | long | 4 | – | – |
| 5 | float | 4 | – | – |
| 6 | double | 8 | – | – |
| 7 | short_Accum | 4 | A1 | A2 |
| 8 | long_Accum | 8 | B1 | B2 |

COMPUTER SYSTEM FOR COMPILING SOURCE PROGRAM

RELATED APPLICATION(S)

The present disclosure relates to the subject matter contained in Japanese Patent Application No. 2005-265851 filed on Sep. 13, 2005, which is incorporated herein by reference in its entirety.

FIELD

The present invention relates to a computer system that translates (compiles) a source program (source code) described in a high-level language such as a C language into a machine language (object code).

BACKGROUND

It is known that when processing multimedia data including audio data and video data, it is possible to obtain a result in adequate precision more faster by processing the data in a fixed-point data type (herein after, simply referred to as a fixed-point type), instead of processing the data in a floating-point data type (herein after, simply referred to as a floating-point type) However, since a fixed-point type is not usually defined in a programming language, a program serving as a reference for creating a new program is generally described by using a floating-point type. In this case, it is needed to manually convert a part described in the floating-point type into an integer type in which a pseudo fixed point is represented. Therefore, it takes time to manually convert the type and there is a possibility of producing a software bug.

In consideration of the above problem, a method of converting fixed-point type description into floating-point type description by compiling the data using the floating point description and linking library using a linker at the final stage of generating the object code has been used.

An example of such method can be found in a program library called "C28x IQMath Library—A Virtual Floating Point Engine", which is provided by Texas Instrument Incorporated. The program library is available from the website having the following URL: http://www.ti.com/iqmath However, according to the above related art, the floating point type description in the source program cannot be compiled into the fixed point type description.

SUMMARY

According to one aspect of the invention, there is provided a computer system for compiling a source program, the system including: a storage unit that stores the source program and type information representing data types including a fixed-point type; a detecting unit that obtains the source program from the storage unit and detects a type specifier and an immediate from the obtained source program; a type specifier analyzing unit that analyzes the type specifier and links one of a variable and a function, data type of which is specified by the type specifier, to the type information of the fixed-point type when the type specifier is a floating-point type to store in the storage unit; and an immediate analyzing unit that analyzes the immediate and links the immediate to the type information of fixed-point type when the immediate is any one of a decimal number with a postfix and a decimal number with floating-point type postfix to store in the storage unit.

DETAILED DESCRIPTION OF THE EMBODIMENT(S)

Figure 1:
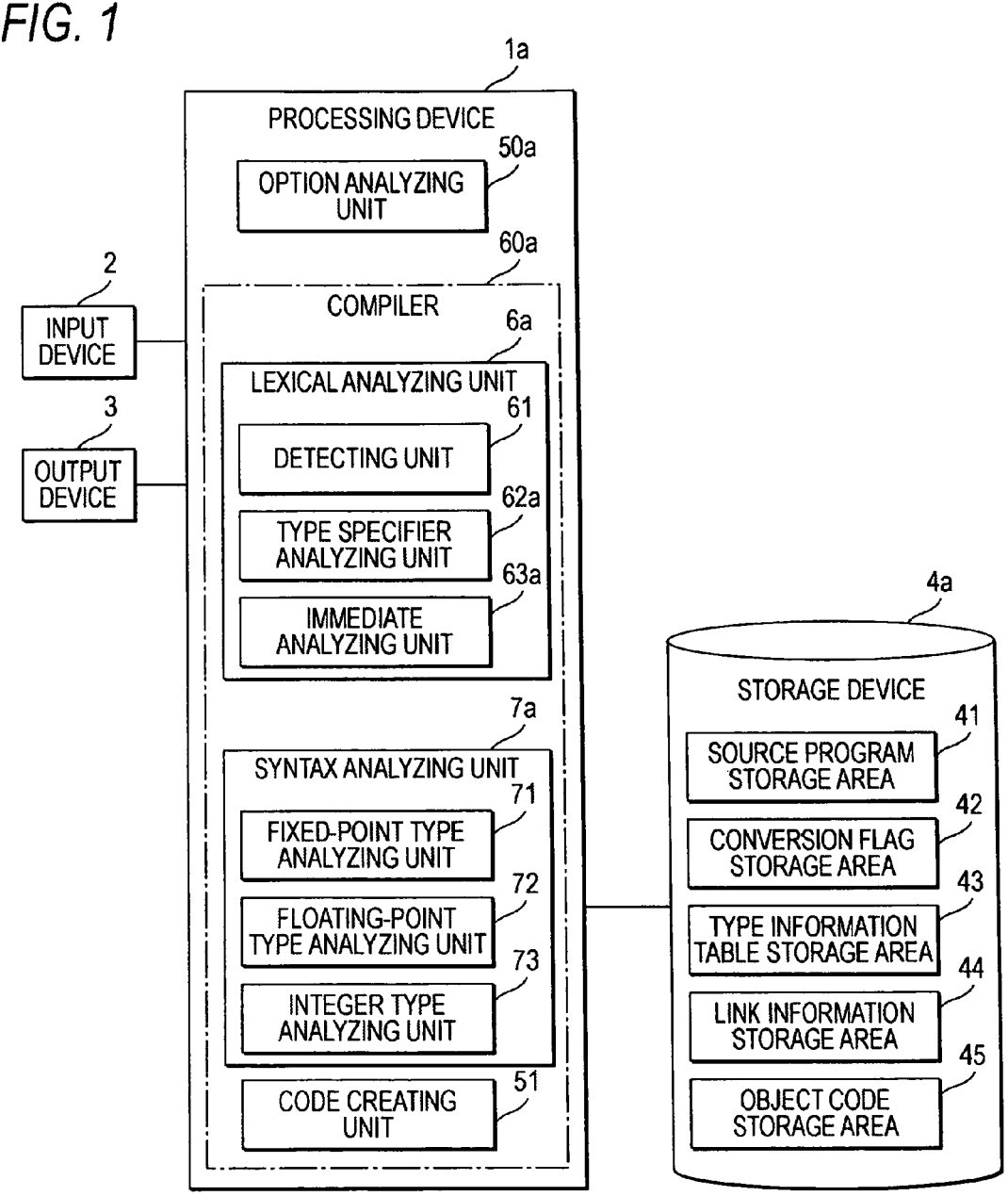
FIG. 1 is a functional block diagram showing a structural example of a computer system according to a first embodiment of the invention.
Figure 2:
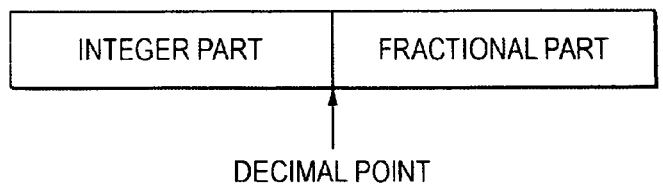
FIG. 2 is a diagram showing a notation example of a fixed point numbers used in the computer system according to the first embodiment of the invention.

Hereinafter, first and second embodiments of the invention will be described. In the description of the drawing of the first and second embodiments, the same or similar elements will be denoted by the same or similar reference numerals.

First Embodiment

As shown in FIG. 1, a computer system (compiler apparatus) according to the first embodiment of the invention includes a processing device 1a, an input device 2, an output device 3, and a storage device 4a. The processing device 1a executes functions of a lexical analyzing unit 6a that analyzes lexica of the source program to divide into a plurality of tokens in order to compile the source program into an object code, a syntax analyzing unit 7a that analyzes whether there is a syntax error in the source program that is lexically analyzed and a code creating unit 51 that creates the object code on the basis of the source program whose syntax is analyzed. The storage device 4a stores the source program that is described in a high-level language such as a C language and type information of various data types including a fixed-point type. In the following description, a case when the source program is described in the C language is exemplified. The lexical analyzing unit 6a includes a detecting unit 61 that obtains the source program from the storage device 4a and detects the type specifier and the immediate using the obtained source program, a type specifier analyzing unit 62a that analyzes the type specifier and when the type specifier is a floating-point type, links any one of the variable and the function whose data type is specified by the type specifier to the type information of the fixed-point type to store in the storage unit 4a, and an immediate analyzing unit 63a that analyzes the immediate and links the immediate to the type information of fixed-point type when the immediate is any one of a decimal number without a postfix (suffix) and a decimal number with floating-point type postfix.

In the description herein, the "type specifier" refers to a specifier that specifies a data type of a variable. A floating point number is represented by an exponent and a significand. In contrast, a fixed point number is represented such that a decimal point is positioned at a predetermined position of the bit strings, and upper bits and lower bits correspond to an integer part and a fractional part, respectively. Even though the value range that can be represented by the fixed point number is narrower than that of the floating point number, the fixed point number can be calculated as the same data as an integer. Therefore, when using the fixed point number, the calculation is quickly performed.

The "immediate" refers to a fixed number described in the source program. The "postfix" is used to indicate a size and a sign of the immediate. Further, the "type information" includes a type number, a type name, a size, etc. of the data type.

The processing device 1a further includes an option analyzing unit 50a that analyzes the compiling option when the compiler 60a is operated, and determines whether the type conversion from the floating-point type into the fixed-point type is indicated. When the type conversion is indicated in the compiling option, it does not need to change the source program. When the option analyzing unit 50a determines that the type conversion from the floating-point type into the fixed-point type is indicated, the option analyzing unit 50a makes a conversion flag. Specifically, a value of the conversion flag is set to true (logical value "1").

When the value of the conversion flag is true, the type specifier analyzing unit 62a links any one of the variable or the function whose data type is specified to the type information of the fixed-point type with reference to the value of the conversion flag. Similarly, when the value of the conversion flag is true, the immediate analyzing unit 63a links any one of a decimal number having no postfix and a decimal number having a floating-point type postfix to the type information of the fixed-point type with reference to the value of the conversion flag.

When the value of the conversion flag is true, the type specifier analyzing unit 62a links the type specifier of the floating-point type described in the source program to the type information of the corresponding fixed-point type (for example, the same size). In the case of the C language, the single precision floating-point type is linked to the type information of a short fixed-point type (short_Accum), and the double precision floating-point type is linked to the type information of a long fixed-point type (long_Accum).

The storage device 4a shown in FIG. 1 includes a source program storage area 41, a conversion flag storage area 42, a type information table storage area 43, a link information storage area 44, and an object code storage area 45. The storage program is stored in the source program storage area 41. The value of the conversion flag is stored in the conversion flag storage area 42. The type information of various data type including the fixed-point type is stored in the type information table storage area 43. Link results from the type specifier analyzing unit 62a and the immediate analyzing unit 63a is stored in the link information storage area 44. Object codes created by the code creating unit 51 are stored in the object code storage area 45.

Figures 3, 4, 5:
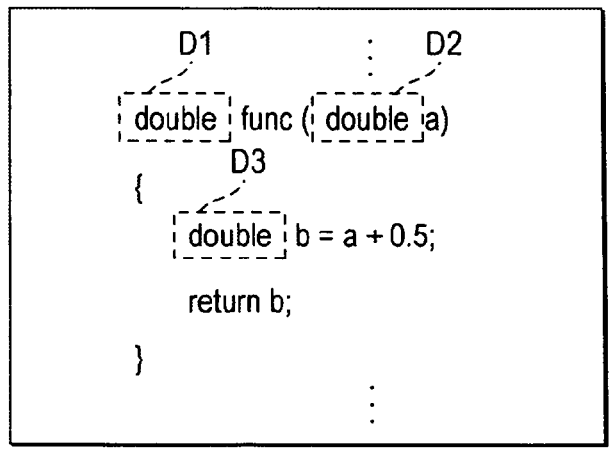
FIG. 3 is a diagram showing an example of a type information table according to the first embodiment of the invention.
FIG. 4 is a diagram showing an example of a source program stored in a storage device according to the first embodiment of the invention.
FIG. 5 is a diagram showing an example of link information according to the first embodiment of the invention.

A type information table shown in FIG. 3 is previously stored in the type information table storage area 43. In the example of the type information table shown in FIG. 1, type numbers, type names, and sizes of the respective data type are defined. The "type number" refers to an identifier that is capable of identifying the data types. The "type name" refers to a name of the data type defined by a programming language. The "size" defines the data size of the data type in terms of bytes.

In the example of the type information table shown in FIG. 3, the "char" type corresponding to the type number "1" indicates a character type and the data type represents character (binary coded character). The "short" type corresponding to the type number "2" is a data type indicating an integer value. The "int" type corresponding to the type number "3" is a data type indicating an integer value whose byte width is equal to or longer than that of the "short" type. The "long" type corresponding to the type number "4" is a data type indicating an integer value whose byte width is equal to or longer than that of the "int" type, and in the example shown in FIG. 3, the byte width of the "long" type is equal to the byte width of the "int" type.

The "float" type corresponding to the type number "5" is a data type indicating the single precision floating point number, and the byte width is 4 byte. The "double" type corresponding to the type number "6" is a data type indicating the double precision floating point number, and the byte width is 8 byte which is longer than the "float" type.

The "short_Accum" type corresponding to the type number "7" is a data type indicating the fixed point number, and the byte width is 4 byte. The "long_Accum" type corresponding to the type number "8" is a data type indicating a fixed point number, and the byte width is 8 byte which is longer than that of the "short_Accum" type.

The source program as shown in FIG. 4 is stored in the source program storage area 41 shown in FIG. 1. In the example shown in FIG. 4, a function "func" in which an argument is a double type variable "a" and a returned value is a double type variable "b" is exemplified.

The detecting unit 61 detects type specifiers "double" D1, D2, and D3 and an immediate "0.5" from the source program shown in FIG. 4. When the value of the conversion flag stored in the conversion flag storage area 42 is true, as shown in FIG. 5, the type specifier analyzing unit 62a links the function "func" whose data type is specified by the type specifier "double" D1, the variable "a" whose data type is specified by the type specifier "double" D2, and the variable "b" whose data type is specified by the type specifier "double" D3 to the type number "8" (long_Accum) shown in FIG. 3.

When the value of the conversion flag stored in the conversion flag storage area 42 is true, as shown in FIG. 5, the immediate analyzing unit 63a links the immediate "0.5" to the type number "8" (long_Accum) shown in FIG. 3. As a result, the link information as shown in FIG. 5 is created.

The syntax analyzing unit 7a performs syntax analysis with reference to the link information. Therefore, in the example shown in FIG. 5, the function "func", the variables "a" and "b", and the immediate "0.5" are analyzed as a "long_Accum" type to be syntax analyzed. Therefore, the syntax analyzed source program becomes a program shown in FIG. 6. In the program shown in FIG. 6, the type specifier "double" is converted into the type specifier "long_Accum". In the program shown in FIG. 6, the type specifier "double" shown in FIG. 4 is converted into the type specifier "long_Accum". The immediate "0.5" shown in FIG. 4 is attached with a postfix "k" that indicates long fixed-point type.

When the value of the conversion flag stored in the conversion flag storage area 42 is false (logical value "0"), the type specifier analyzing unit 62a links the function "func" whose data type is specified by the type specifier "double" D1, the variable "a" whose data type is specified by the type specifier "double" D2, and the variable "b" whose data type is specified by the type specifier "double" D3 to the type number "6" (double) shown in FIG. 3.

When the value of the conversion flag stored in the conversion flag storage area 42 is false, the immediate analyzing unit 63a links the immediate "0.5" to the type number "6" (double) shown in FIG. 3. Therefore, when the value of the conversion flag is false, the syntax analyzed source program maintains the description shown in FIG. 4.

In detail, the syntax analyzing unit 7a shown in FIG. 1 includes for example, a fixed-point type analyzing unit 71, a floating-point type analyzing unit 72, and an integer type analyzing unit 73. The fixed-point type analyzing unit 71, the floating-point type analyzing unit 72, and the integer type analyzing unit 73 analyzes the syntaxes of fixed-point type description, floating-point type description, and integer type description, respectively, with reference to the type information table. Further, the syntax analyzing unit 7a further includes a character type analyzing unit which is not shown.

Figures 6, 7, 8:
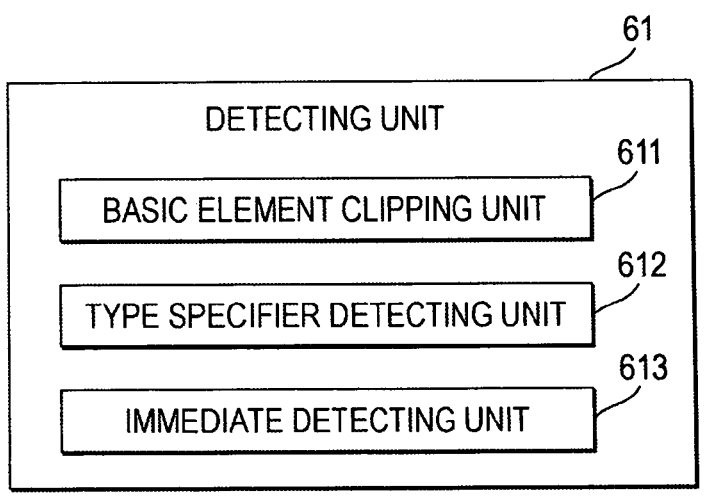
FIG. 6 is a diagram showing an example of a program obtained by converting the source program by the computer system according to the first embodiment of the invention.
FIG. 7 is a functional block diagram showing a structural example of a detecting unit according to the first embodiment of the invention.
FIG. 8 is a view illustrating a basic element clipping process in the computer system according to the first embodiment of the invention.

The detecting unit 61 includes a basic element clipping unit 611, a type specifier detecting unit 612, and an immediate detecting unit 613, as shown in FIG. 7. The basic element clipping unit 611 clips the source program for every basic element. In here, the "basic element" refers to a minimal unit of a program such as a keyword, an operator, a variable name, a fixed number, and a delimiting symbol of a programming language. For example, in the example of the source program shown in FIG. 4, each of the descriptions surrounded by the broken line as shown in FIG. 8 corresponds to the basic element.

The type specifier detecting unit 612 detects any one of the type specifier, a variable and a function whose data type is specified by the type specifier, from the source program that is divided into a plurality of basic elements. The immediate detecting unit 613 detects any one of a decimal number having no postfix and a decimal number having a floating-point type postfix from the source program that is divided into a plurality of basic elements.

Figure 9:
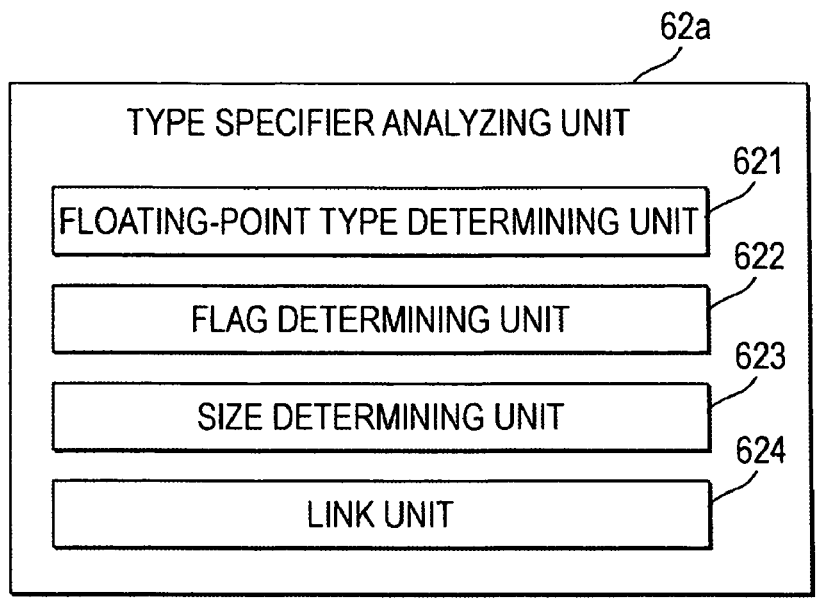
FIG. 9 is a functional block diagram showing a structural example of a type specifier analyzing unit according to the first embodiment of the invention.

The type specifier analyzing unit 62a includes a floating-point type determining unit 621, a flag determining unit 622, a size determining unit 623, and a link unit 624, as shown in FIG. 9. The floating-point type determining unit 621 determines whether the detected type specifier is a floating-point type. The flag determining unit 622 determines whether the value of the conversion flag is true. When the value of the conversion flag is true, the size determining unit 623 determines a size of the detected type specifier. When the value of the conversion flag is true, the link unit 624 links the detected type specifier to type information of the fixed-point type corresponding to the determined size.

Figure 10:
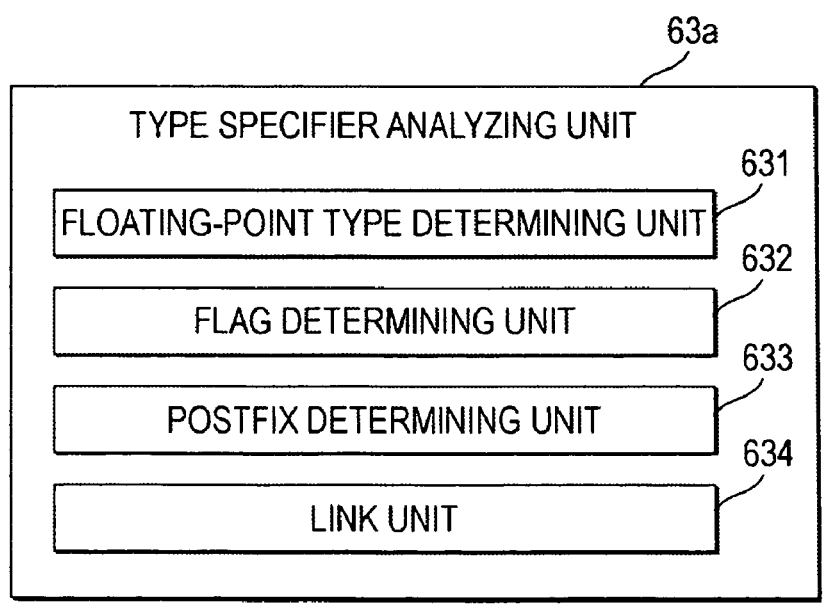
FIG. 10 is a functional block diagram showing a structural example of an immediate analyzing unit according to the first embodiment of the invention.

The immediate analyzing unit 63a includes a floating-point type determining unit 631, a flag determining unit 632, a postfix determining unit 633, and a link unit 634, as shown in FIG. 10. The floating-point type determining unit 631 determines whether the detected immediate is a floating-point type. The postfix determining unit 633 determines whether the detected immediate has a postfix. Further, the postfix determining unit 633 determines whether the postfix attached to the detected immediate is a floating-point type. The flag determining unit 632 determines whether the value of the conversion flag is true. However, instead of using the flag determining unit 632, it is preferable to use the results determined by the flag determining unit 622 shown in FIG. 9. When the value of the conversion flag is true, the link unit 634 links the floating-point type immediate to the type information of the corresponding fixed-point type.

Examples of the input device 2 shown in FIG. 1 include a keyboard, a mouse, etc. Examples of the output device 3 include a display or a printer. The storage device 4a includes an auxiliary storage device such as a hard disc, etc., a main storage device such as SDRAM, etc., or a cache memory, a register, etc.

Figure 11:
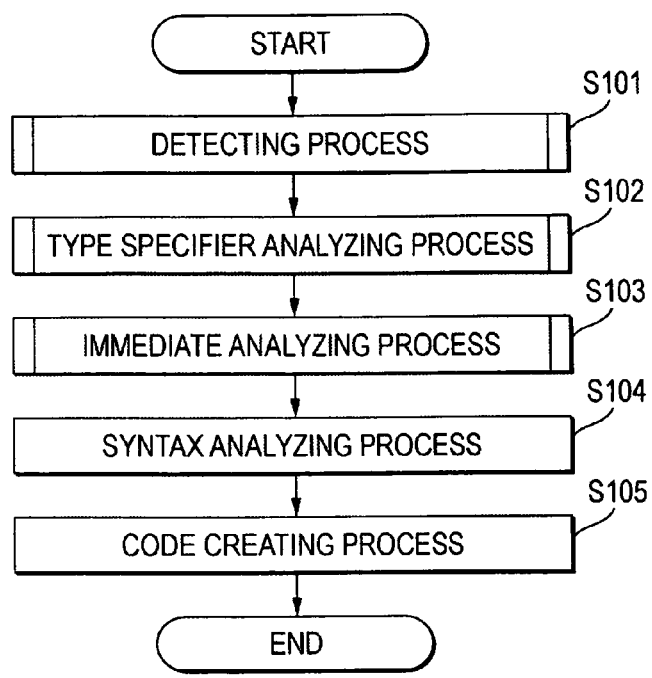
FIG. 11 is a flow chart showing an example of a compiling method according to the first embodiment of the invention.

Next, an outline of an operation of the computer system shown in FIG. 1 will be described with reference to a flow chart of FIG. 11.

(A) In step S101, the detecting unit 61 obtains the source program stored in the source program storage area 41 and detects a type specifier and an immediate from the obtained source program. The option analyzing unit 50a analyzes the compile option when the compiler before obtaining the source program is operated. Further, the detailed process of step S101 will be described later.

(B) In step S102, the type specifier analyzing unit 62a analyzes the type specifier detected in step S101 and, any one of a variable and a function whose data type is specified by the type specifier. The detailed process of step S102 will be described later.

(C) In step S103, the immediate analyzing unit 63a analyzes the immediate detected instep S101. The detailed process of step S103 will be described later. It is preferable that step S103 is performed prior to step S102 or simultaneously with step S102. The results of steps S101 to 103 is provided to the syntax analyzing unit 7a as a plurality of tokens.

(D) In step S104, the syntax analyzing unit 7a analyzes the syntax of the source program that is divided in terms of token. Specifically, the syntax analyzing unit 7a checks whether the token string obtained by lexical analysis follows the grammatical rules of the programming language, and converts the program into a tree structure that is called a syntax tree.

(E) In step S105, the code creating unit 51 converts the source program whose syntax analysis is performed into an intermediate code, and creates an object code after optimizing the intermediate code. Otherwise, instead of conversing the source program into the intermediate code, it is preferable to directly create the object code. The created object code is stored in the object code storage area 45.

Figure 12:
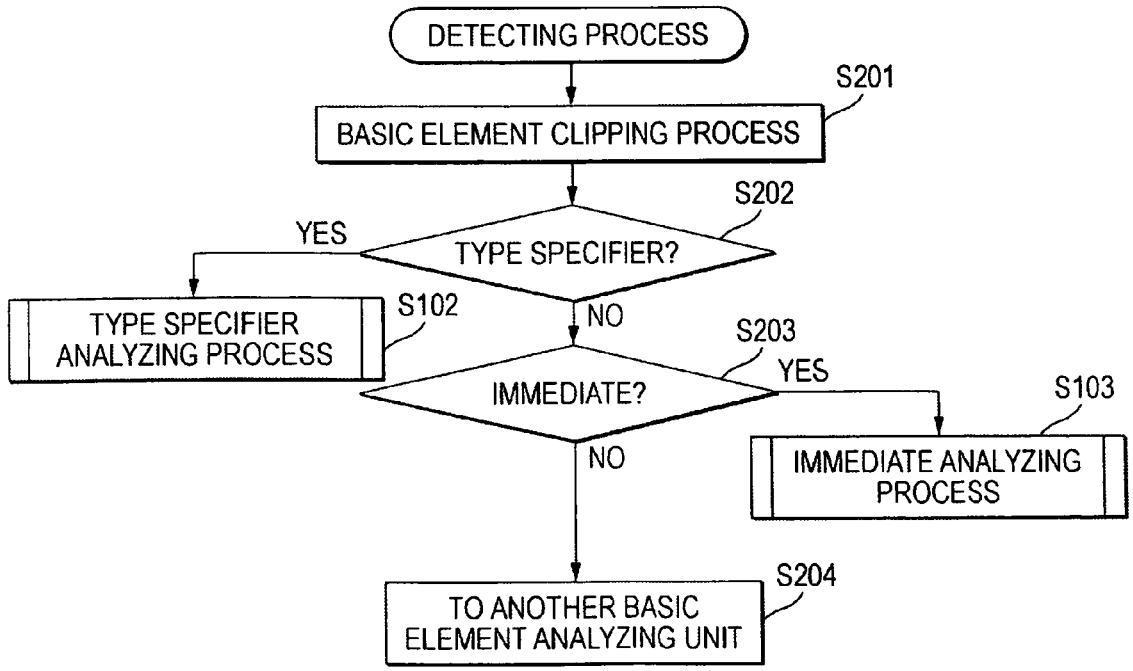
FIG. 12 is a flow chart showing a detecting process in the compiling method according to the first embodiment of the invention.

Next, referring to a flow chart shown in FIG. 12, procedures of the detecting process by the detecting unit 61 shown in FIG. 7 will be described.

(a1) In step S201, the basic element clipping unit 611 divides the source program into basic elements.

(a2) In step S202, the type specifier detecting unit 612 determines whether the clipped basic element is any one of a type specifier, a variable and a function whose data type is specified by the type specifier. If the clipped basic element is any one of the type specifier, a variable and a function whose data type is specified by the type specifier, the process proceeds to step S102.

(a3) In step S203, the immediate detecting unit 613 determines whether the clipped basic element is any one of a decimal number with a postfix and a decimal number with floating-point type postfix. If the clipped basic element is any one of a decimal number with a postfix and a decimal number with floating-point type postfix, the process proceeds to step S103. Further, step S203 may be performed prior to step S202 or simultaneously with step S202.

(a4) In step S204, it is determined whether the clipped basic element is a basic element regardless to the type conversion. Therefore, the basic element analyzing process is performed by another basic element analyzing unit.

Figure 13:
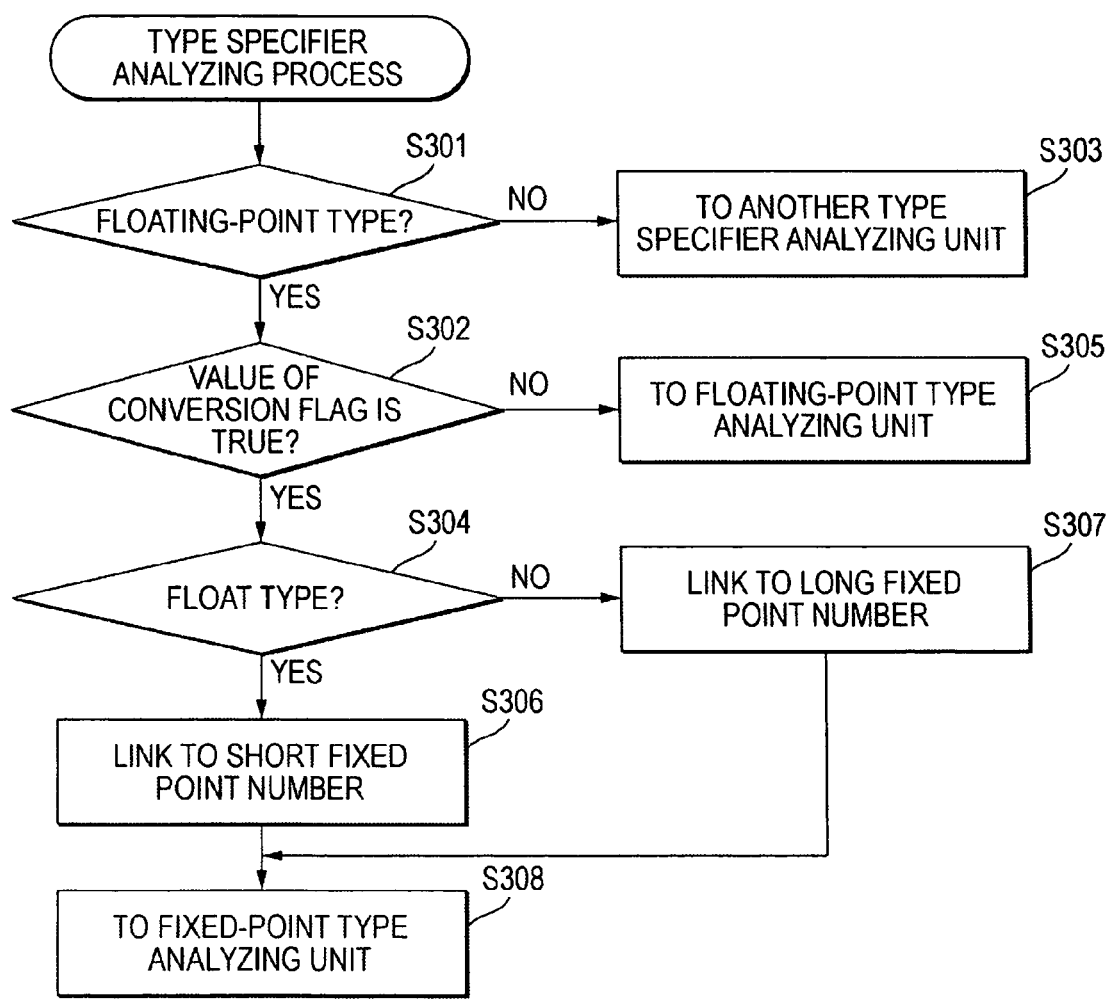
FIG. 13 is a flow chart showing a type specifier analyzing process in the compiling method according to the first embodiment of the invention.

Next, referring to a flow chart shown in FIG. 13, procedures of the type specifier analyzing process by the type specifier analyzing unit 62a shown in FIG. 9 will be described.

(b1) In step S301, the floating-point type determining unit 621 determines whether the detected type specifier is a floating-point type. If the detected type specifier is a floating-point type, the process proceeds to step 302. In contrast, if the detected type specifier is not the floating-point type, the process proceeds to step 303. In step S303, the syntax analysis is performed by the integer type analyzing unit 73 shown in FIG. 1 or a character type analyzing unit which is not shown.

(b2) In step S302, the flag determining unit 622 determines whether the value of the conversion flag stored in the conversion flag storage area 42 is true. If the value of the conversion flag is true, the process proceeds to step S304. In contrast, if the value of the conversion flag is false, the process proceeds to step S305. In step S305, the syntax analysis is performed by the floating-point type analyzing unit 72.

(b3) In step S304, the size determining unit 623 determines whether a size of the type specifier of the floating-point type is a float size. If the size of the type specifier the floating-point type is the float size, the process proceeds to step S306. If the size of the type specifier of the floating-point type is not the float size, that is, if the size is a double size, the process proceeds to step S307.

(b4) In step S306, the link unit 624 links the variable or the function specified to the float type to "short$_{13}$ Accum" corresponding to the type number 7 of FIG. 3. When the linking process is completed, the process proceeds to step S308.

(b5) In step S307, the link unit 624 links the variable or the function specified to the double type to "long_Accum" corresponding to the type number 8 of FIG. 3. When the linking process is completed, the process proceeds to step S308.

(b6) In step S308, the syntax analysis is performed by the fixed-point type analyzing unit 71.

Figure 14:
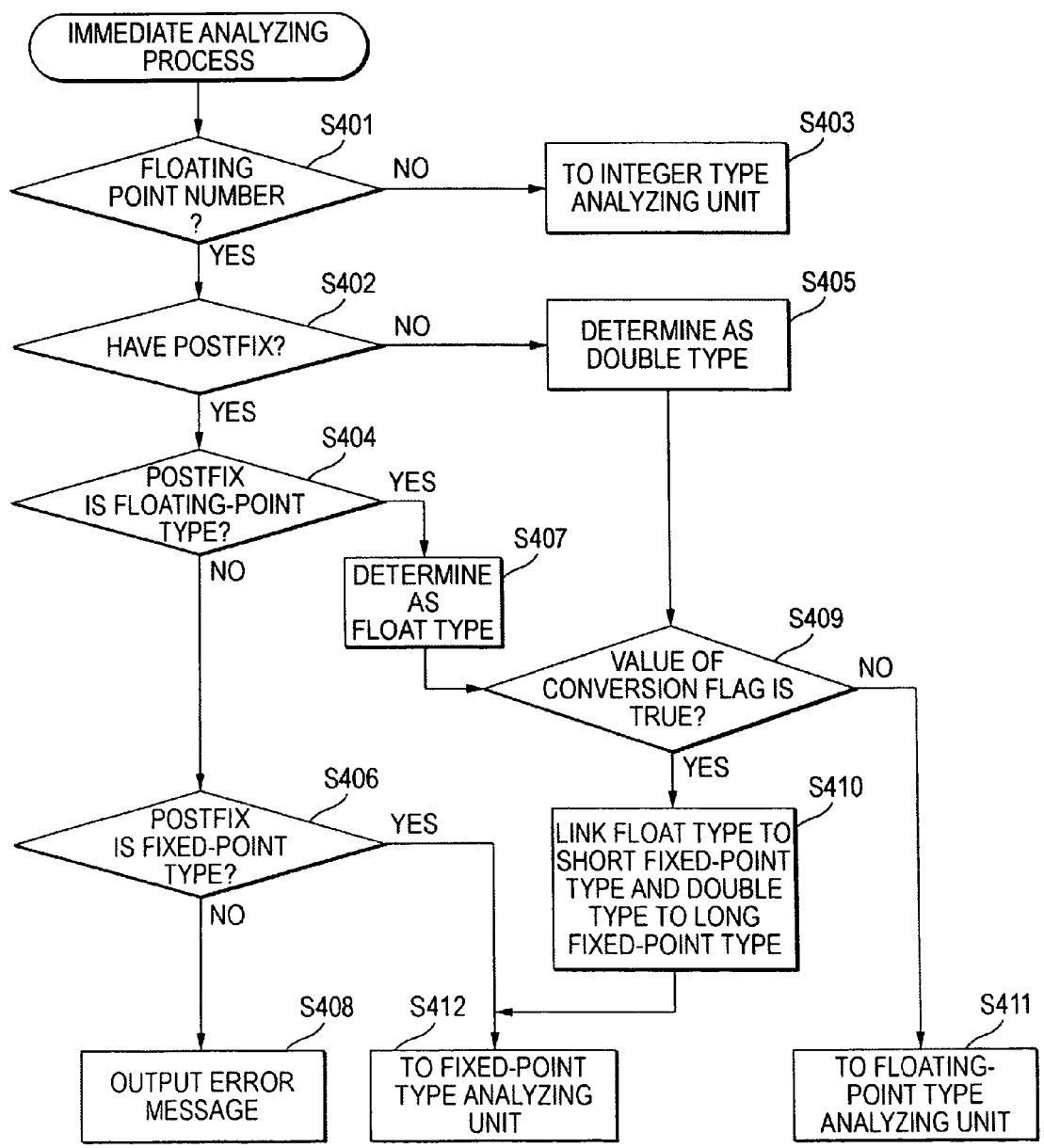
FIG. 14 is a flow chart showing an immediate analyzing process in the compiling method according to the first embodiment of the invention.

Next, referring to a flow chart shown in FIG. 14, procedures of the type specifier analyzing process by the immediate analyzing unit 63a shown in FIG. 10 will be described.

(c1) In step S401, the floating-point type determining unit 631 determines whether the detected immediate is a floating-point type. If the immediate is a floating-point type, the process proceeds to step S402. If the immediate is not a floating-point type, the process proceeds to step S403. In step S403, the syntax analysis is performed by the integer type analyzing unit 73 shown in FIG. 1.

(c2) In step S402, the postfix determining unit 633 determines whether the immediate has a postfix. If the immediate has a postfix, the process proceeds to step S404. If the immediate does not have a postfix, the process proceeds to step S405. In the step S405, it is determined that the immediate is a double type.

(c3) In step S404, the postfix determining unit 633 determines whether the postfix attached to the immediate is a floating-point type. If the postfix is a floating-point type, the process proceeds to step S406. If the postfix is not a floating-point type, the process proceeds to step S407. In step S407, it is determined that the immediate is a float type.

(c4) In step S409, the flag determining unit 632 determines whether the value of the conversion flag is true. If the value of the conversion flag is true, the process proceeds to step S410. If the value of the conversion flag is false, the process proceeds to step S411. In step S411, the syntax analysis is performed by the floating-point type analyzing unit 72.

(c5) In step S406, the postfix determining unit 633 determines whether the postfix is a fixed-point type. If the postfix is a fixed-point type, the process proceeds to step S412. If the postfix is not a fixed-point type, the process proceeds to step S408. In step S412, the syntax analysis is performed by the fixed-point type analyzing unit 71. In step S408, for example, an error message (warning message) is displayed on a display serving as the output device 3 shown in FIG. 1.

In the embodiment, the processing device 1a serves as an error output unit that checks whether or not the accuracy is reduced when converting a floating point immediate to fixed-point immediate, and dumps a warning message when the accuracy is reduced.

As described above, according to the computer system according to the first embodiment of the invention, the floating-point type description described in the source program is analyzed and then compiled to the fixed-point type. As a result, it is possible to considerably reduce the conversion time as compared with the manual conversion. Therefore, it is possible to easily estimate the code size and the performance when converting the floating-point type description into the fixed-point type description.

First Modification of First Embodiment

A computer system according to a first modification of the first embodiment of the invention can obtain a program in which the floating-point type description in the source program is converted into the fixed-point type description by rewriting the syntax analysis result by the syntax analyzing unit 7a in the source program storage area 41 as compared with the computer system shown in FIG. 1 that performs to the process of creating the object code on the basis of the source program whose syntax is analyzed.

Therefore, by the computer system according to the first modification of the first embodiment of the invention, it is possible to obtain a result that the floating-point type description in the source program is converted into the fixed-point type description. Therefore, it is further possible to compile by using another computer system.

Second Modification of First Embodiment

Figure 15:
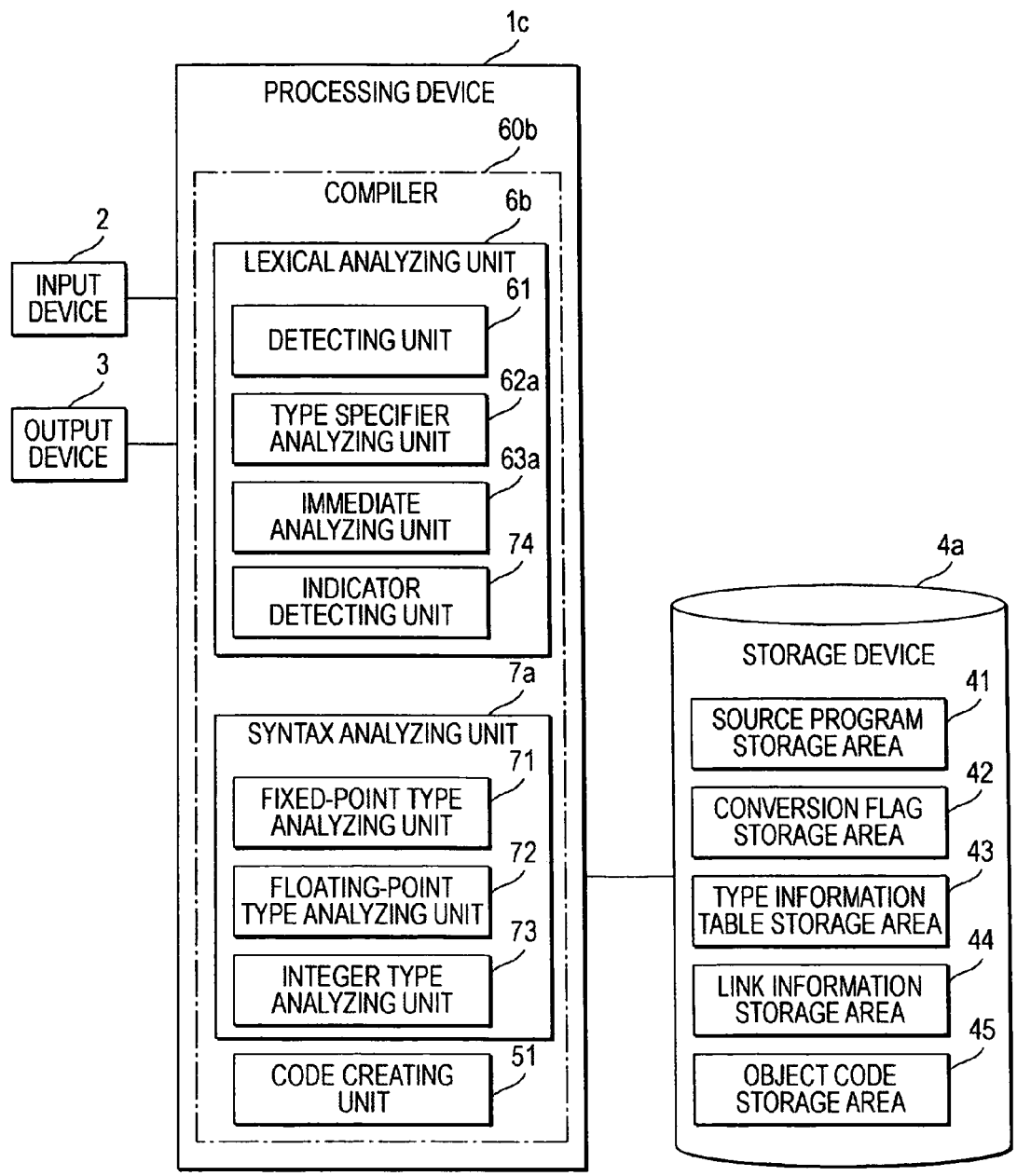
FIG. 15 is a functional block diagram showing a structural example of a computer system according to a second modification of the first embodiment of the invention.

In a computer system according to a second modification of the first embodiment of the invention, as shown in FIG. 15, the lexical analyzing unit 6b further includes an indicator detecting unit 74 that detects a compiler indicator indicating the data type conversion of the floating-point type into the fixed-point type. That is, instead of making the conversion flag at a compiler option indicated at the time of compiling, the compiler indicator for the compiler may be described in the source program. For example, #pragma directive is used as a compiler indicator in the C language.

In this case, even though the source program is necessarily changed, if a header file in which the #pragma directive is described is prepared and then previously stored in the storage device 4a, and the header file is read at the compile option, it does not need to change the source program.

Therefore, according to the second modification of the first embodiment, it is possible to indicate the conversion of the floating-point type into the fixed-point type during the operation of the compiler 60b.

Third Modification of First Embodiment

Figure 16:
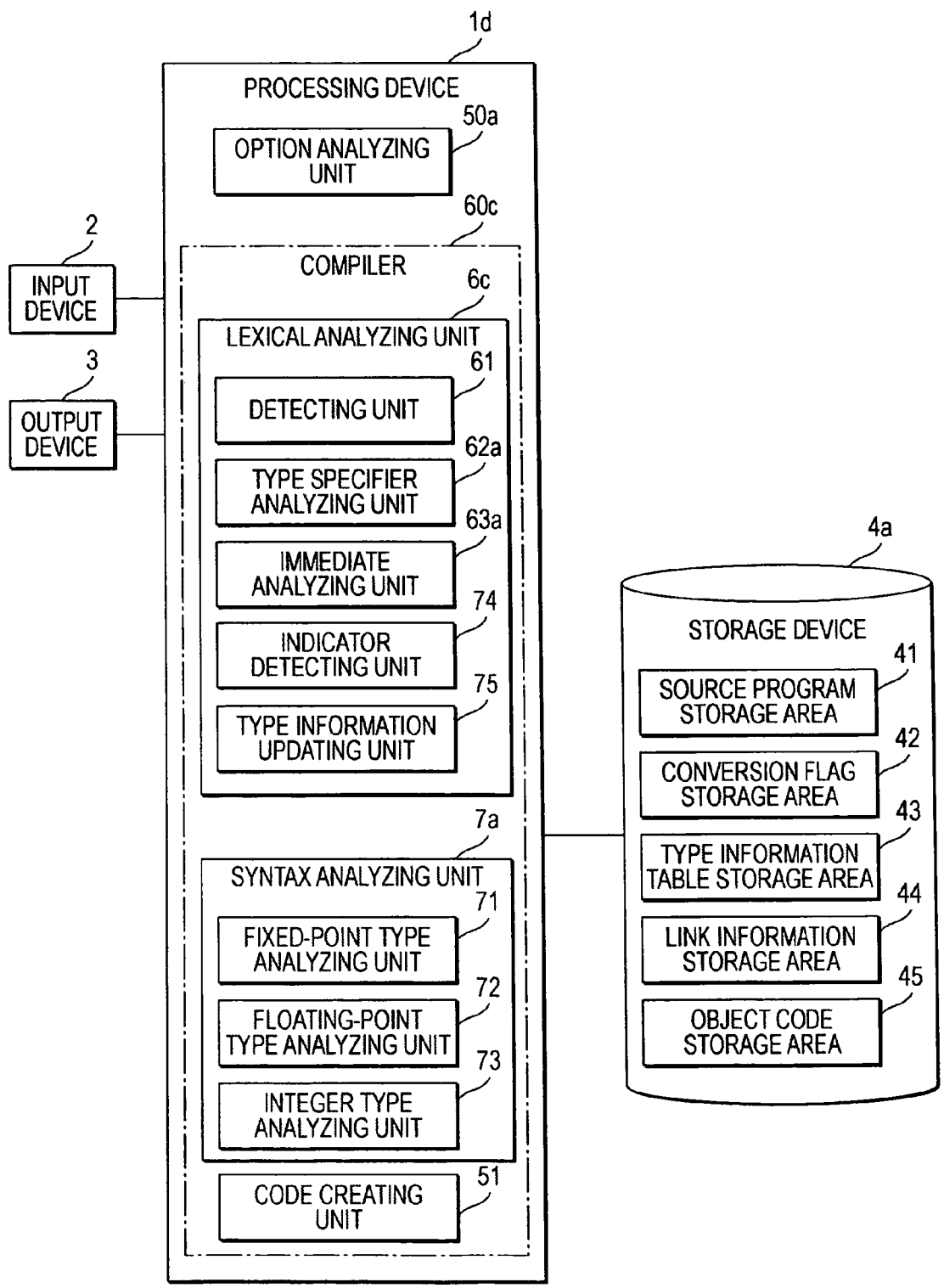
FIG. 16 is a functional block diagram showing a structural example of a computer system according to a third modification of the first embodiment of the invention.

In a computer system according to a third modification of the first embodiment of the invention as shown in FIG. 16, the lexical analyzing unit 6c further includes an indicator detecting unit 74 that detects a compiler indicator redefining bits of an integer part and a fractional part of the type information of the fixed-point type, and a type information updating unit 75 that updates the type information table. Specifically, the type information updating unit 75 updates the bits of the integer part and the fractional part of the type information of the fixed-point type in the type information table as shown in FIG. 17.

Otherwise, instead of the compiler indicator, it is preferable to redefine the bits of the integer part and the fractional part of the type information of the fixed-point type using the compile option. Further, a method of defining the fixed-point type that is performed by a user is described in JP-A No. 2005-141410 in detail.

Figures 17, 18:
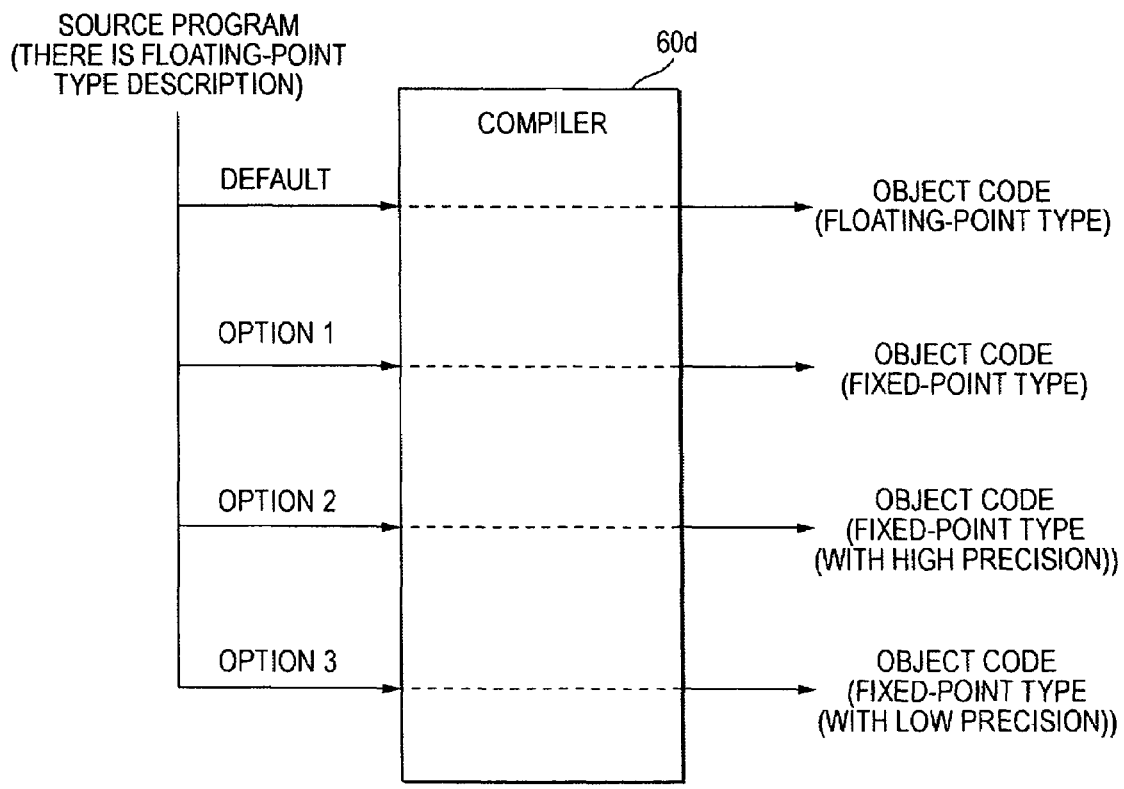
FIG. 17 is a diagram showing an example of a type information table according to the third modification of the first embodiment of the invention.
FIG. 18 is a diagram illustrating a function of a computer system according to a second embodiment of the invention.

In an example of the type information table shown in FIG. 17, it is possible to change a bit A1 of the integer part and a bit A2 of the fractional part of "short_Accum" type corresponding to the type number "7". Similarly, it is possible to change a bit B1 of the integer part and a bit B2 of the fractional part of "long_Accum" type corresponding to the type number "8".

Therefore, according to the computer system according to the third modification of the first embodiment of the invention, it is possible to broadly estimate the performance when converting the floating-point type into the fixed-point type as compared with the case when using only fixed-point type with a limited precision.

Second Embodiment

A compiler 60d according to a second embodiment of the invention converts the floating-point type description in the source program into a desired fixed-point type description using a compile option, as shown in FIG. 18. In an example shown in FIG. 18, in a standard mode (default mode), an object code is created without converting the floating-point type description in the source program into a fixed-point type description. At an option 1, the floating-point type description in the source program is converted into a corresponding fixed-point type description (which has the same size). In an option 2, the floating-point type description in the source program is converted into a fixed-point type description with a high precision (the size is large), for example, a long_Accum type. In an option 3, the floating-point type description in the source program is converted into a fixed-point type description with a low precision (the size is small), for example, a short_Accum type.

Figure 19:
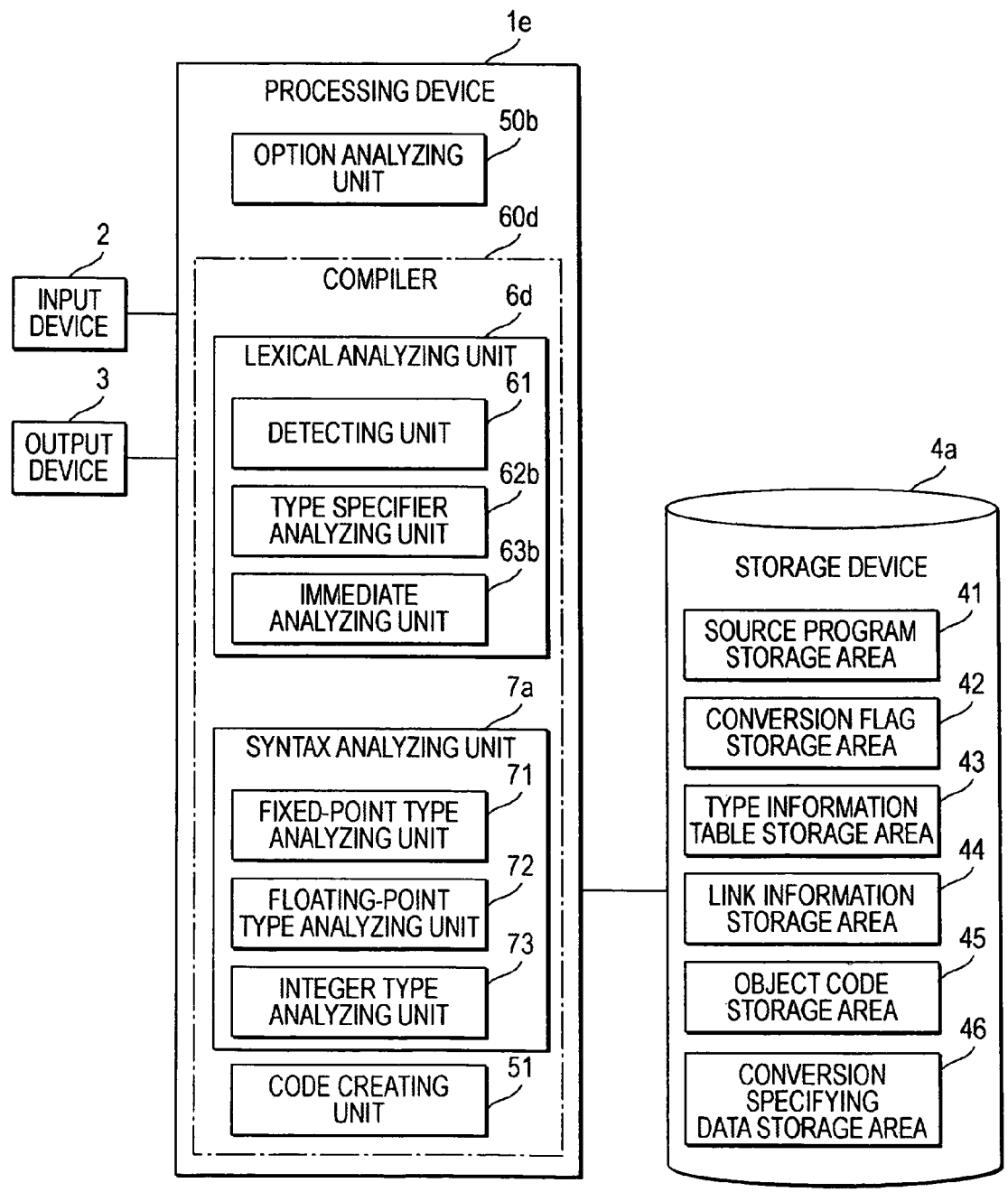
FIG. 19 is a functional block diagram showing a structural example of the computer system according to the second embodiment of the invention.

Specifically, an option analyzing unit 50b shown in FIG. 19 analyzes the compile option when the compiler 60d is operated, and determines whether the compile option indicates the conversion of the floating-point type into the fixed-point type or specifies the size (precision) of the fixed-point type whose type conversion is performed. When the size (precision) of the fixed-point type whose type conversion is performed is specified, the option analyzing unit 50b stores conversion specifying data that specifies the size (precision) of the fixed-point type whose type conversion is performed in the conversion specifying data storage area 46.

Otherwise, instead of storing the conversion specifying data in the conversion specifying data storage area 46, it is possible to specify the size (precision) of the fixed-point type whose type conversion is performed on the basis of the value of the conversion flag, by allowing the conversion flag to have a plurality of bit widths.

Figure 20:
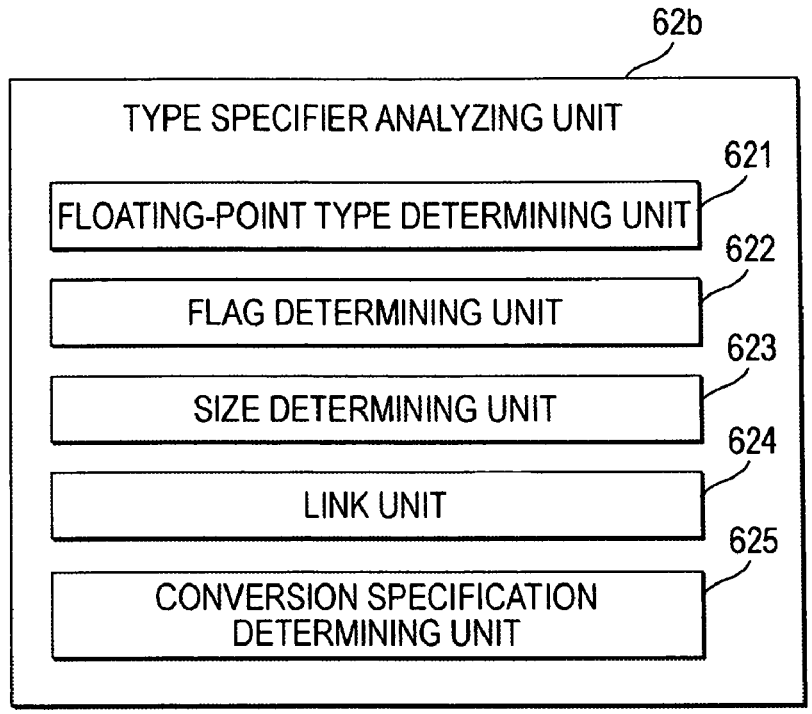
FIG. 20 is a functional block diagram showing a structural example of a type specifier analyzing unit according to the second embodiment of the invention.
Figure 21:
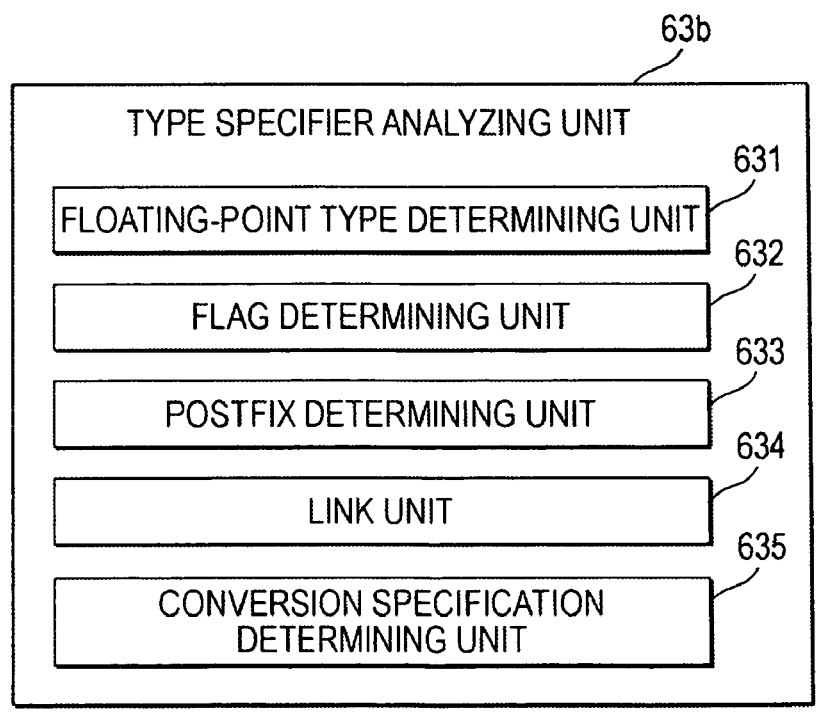
FIG. 21 is a functional block diagram showing a structural example of an immediate analyzing unit according to the second embodiment of the invention.

The type specifier analyzing unit 62b further includes a conversion specification determining unit 625 that determines whether the conversion specifying data specifies the size (precision) of the fixed-point type, as shown in FIG. 20. Similarly, the immediate analyzing unit 63b further includes a conversion specification determining unit 635 that determines whether the conversion specifying data specifies the size (precision) of the fixed-point type, as shown in FIG. 21. In this case, instead of using the conversion specification determining unit 635, it is preferable to use the results determined by the conversion specification determining unit 625 shown in FIG. 20.

Figure 22:
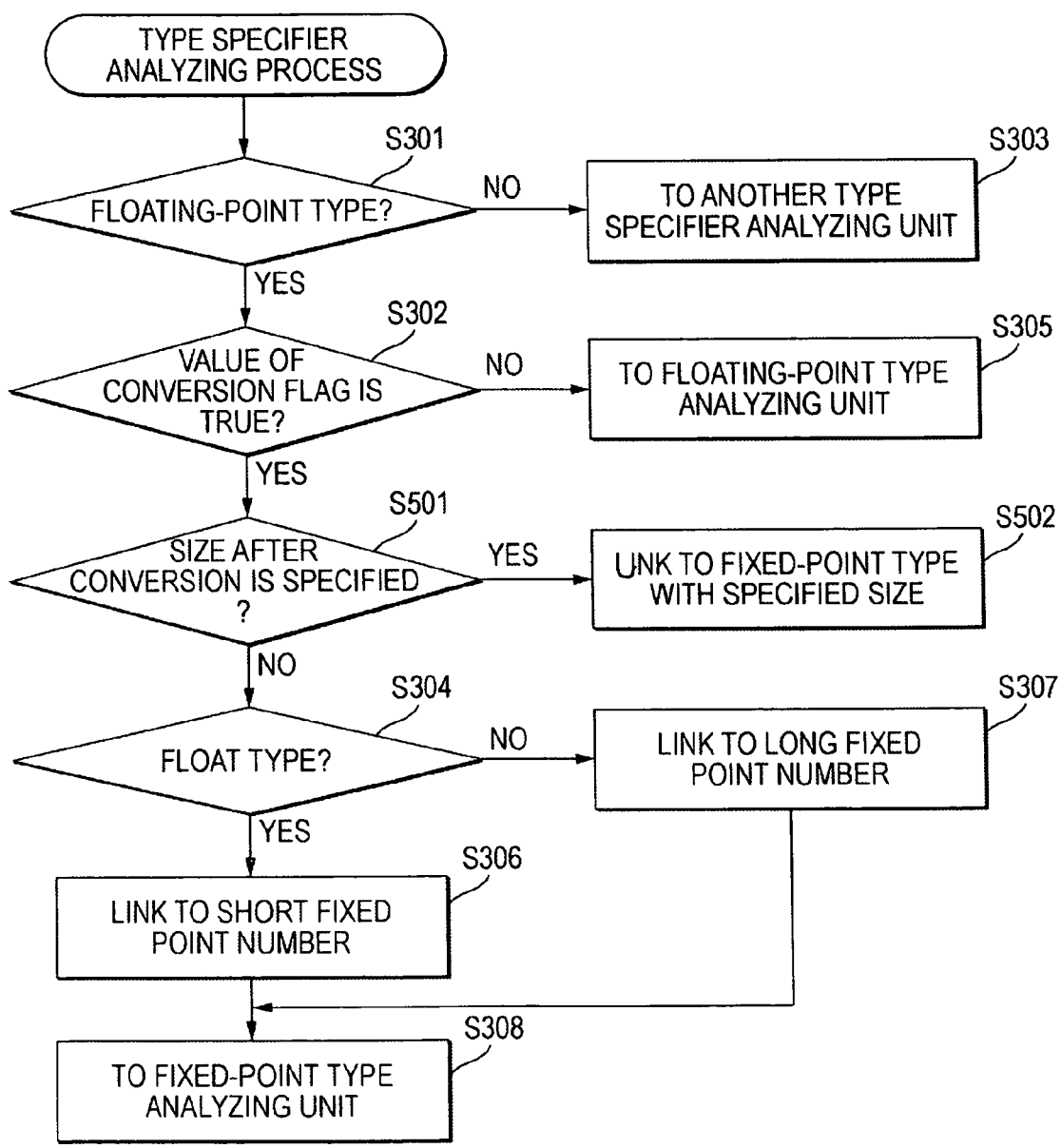
FIG. 22 is a flow chart showing a type specifier analyzing process in the compiling method according to the second embodiment of the invention.

Next, referring to a flow chart shown in FIG. 22, procedures of the type specifier analyzing process by the type specifier analyzing unit 62b shown in FIG. 20 will be described. However, in this case, the description of the same process as the type specifier analyzing process by the type specifier analyzing unit 62a shown in FIG. 9 will be omitted.

(b1) In step S302, the flag determining unit 622 determines whether the value of the conversion flag stored in the conversion flag storage area 42 is true. If the value of the conversion flag is true, the process proceeds to step S501. If the value of the conversion flag is false, the process proceeds to step S305. In step S305, the syntax analysis is performed by the floating-point type analyzing unit 72.

(b2) In step S501, the conversion specification determining unit 625 determines whether the conversion specifying data specifies the size (precision) of the fixed-point type whose type conversion is performed, with reference to the conversion specifying data storage area 46 shown in FIG. 19. In detail, the conversion specification determining unit 625 determines whether the option 2 or 3 shown in FIG. 18 is selected. If the size (precision) of the fixed-point type whose type conversion is done is specified, the process proceeds to step S502. If the size (precision) of the fixed-point type whose type conversion is done is not specified, the process proceeds to step S304.

(b3) In step S502, the link unit 624 links the type specifier of the floating-point type to type information of the fixed-point type having the specified size (precision).

Figure 23:
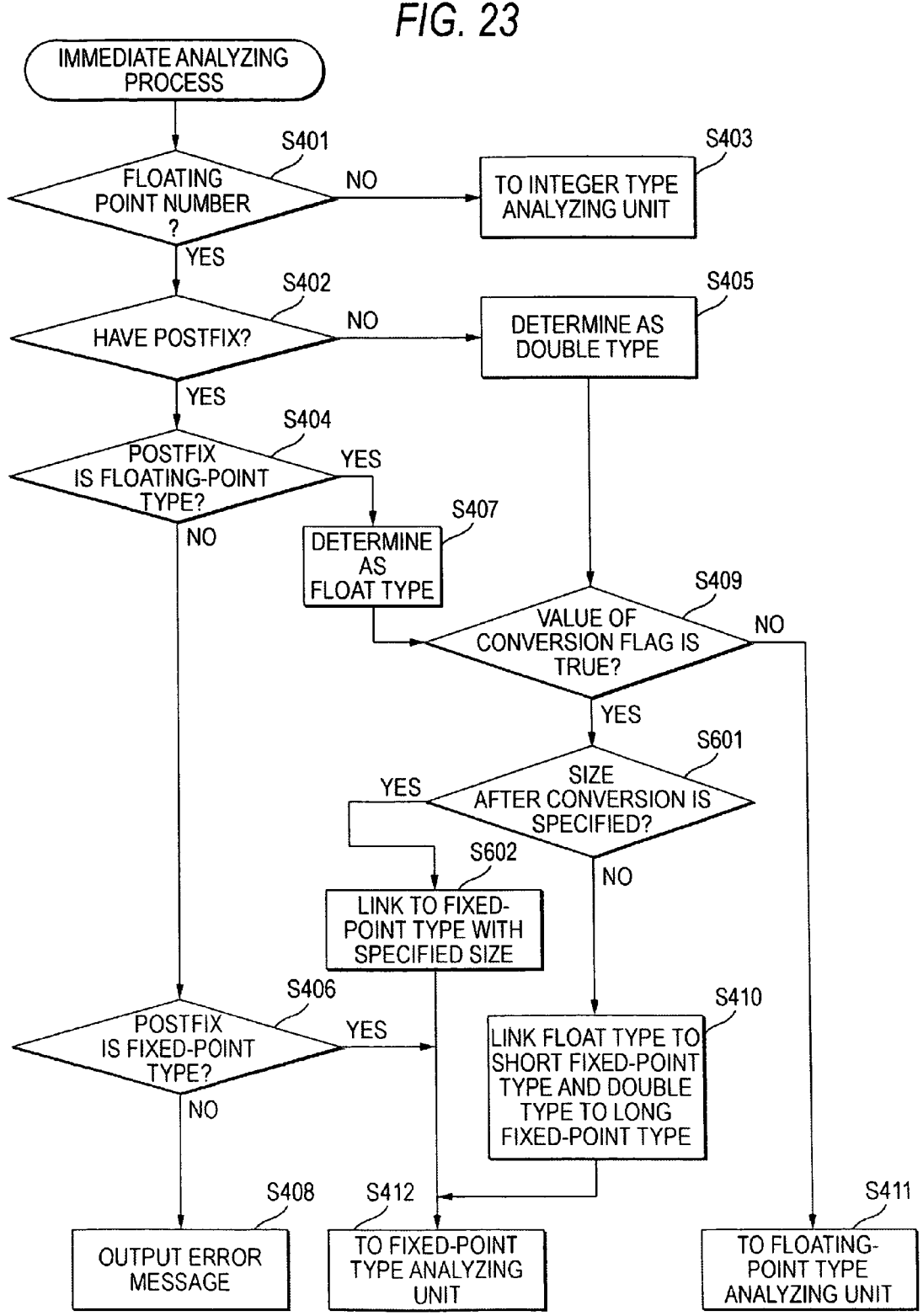
FIG. 23 is a flow chart showing an immediate analyzing process in the compiling method according to the second embodiment of the invention.

Next, referring to a flow chart shown in FIG. 23, procedures of the immediate analyzing process by the immediate analyzing unit 63b shown in FIG. 21 will be described. However, in this case, the description of the same process as the immediate analyzing process by the immediate analyzing unit 63a shown in FIG. 10 will be omitted.

(c1) In step S409, the flag determining unit 632 determines whether the value of the conversion flag is true. If the value of the conversion flag is true, the process proceeds to step S601. If the value of the conversion flag is false, the process proceeds to step S411. In step S411, the syntax analysis is performed by the floating-point type analyzing unit 72.

(c2) In step S601, the conversion specification determining unit 635 determines whether the conversion specifying data specifies the size (precision) of the fixed-point type whose type conversion is performed, with reference to the conversion specifying data storage area 46 shown in FIG. 19. In detail, the conversion specification determining unit 625 determines whether the option 2 or 3 shown in FIG. 18 is selected. If the size (precision) of the fixed-point type whose type conversion is done is specified, the process proceeds to step S602. If the size (precision) of the fixed-point type whose type conversion is performed is not specified, the process proceeds to step S410.

(c3) In step S602, the link unit 634 links the immediate of the floating-point type to type information of the fixed-point type having the specified size (precision).

Therefore, according to the second embodiment, it is possible to provide a computer system that is capable of compiling the floating-point type description in the source program to a desired fixed-point data type.

Other Embodiments

As described above, while the first and second embodiments of this invention have been described, it should be understood that this invention is not limited to the description and the drawings which are a part of the disclosure. Various modifications, embodiments, and operating technology will be apparent to those skilled in the art from the disclosure.

In the above-described embodiments, even though it is described that the source program is described in the C language, it is not limited to the C language. Further, it is applicable to various programming languages such as a C++ language, etc.

Further, the first to third modifications of the first embodiment is applicable to the second embodiment.

The computer system according to the above-described embodiments can obtain the source program from the storage devices 4a and 4b by a network such as a LAN (local area network). In this case, the computer system necessarily includes a communication control device that controls the communication with the network.

Various embodiments that are not described in this specification may fall within the scope of the present invention. The scope of the present invention is to be determined solely by specific matters of claims understood from the disclosure.

According to the present invention, there is provided a computer system that is capable of analyzing and compiling the floating-point type description in the source program into the fixed-point type description.

What is claimed is:

1. A computer system including a processor for compiling a source program, the system comprising:
  a storage unit that stores the source program and type information representing data types including a fixed-point type;
  a detecting unit that obtains the source program from the storage unit and detects a type specifier and an immediate from the obtained source program;
  a type specifier analyzing unit that analyzes the type specifier and links one of a variable and a function, data type of which is specified by the type specifier, to the type information of the fixed-point type when the type specifier is a floating-point type to store in the storage unit, wherein the type specifier analyzing unit links the variable and the function to the type information of the fixed-point type having a specified size;
  an immediate analyzing unit that analyzes the immediate and links the immediate to the type information of fixed-point type when the immediate is any one of a decimal number without a postfix and a decimal number with floating-point type postfix to store in the storage unit, wherein the immediate analyzing unit links the immediate to the type information of the fixed-point type having a specified size; and
  a type information updating unit that updates the type information of the fixed-point type on the basis of redefinition of the number of bits of an integer part and a fractional part in the type information of the fixed-point type.

2. The computer system according to claim 1, further comprising an option analyzing unit that analyzes a compiling option and determines whether a type conversion from the floating-point type into the fixed-point type is indicated.

3. The computer system according to claim 2, wherein the option analyzing unit further determines whether a size of the converted fixed-point type is specified.

4. The computer system according to claim 1, further comprising a specifier detecting unit that detects a compiler directive specifying type conversion from the floating-point type into the fixed-point type.

5. The computer system according to claim 1, further comprising an error output unit that checks whether or not the accuracy is reduced when converting a floating point immediate to fixed-point immediate, and dumps a warning message when the accuracy is reduced.

* * * * *